United States Patent
Mehlan et al.

(10) Patent No.: US 9,924,795 B2
(45) Date of Patent: Mar. 27, 2018

(54) FOOT PLATFORM AND DESK COMPRISING A FOOT PLATFORM

(71) Applicant: SIEMENS AKTIENGESELLSCHAFT, Munich (DE)

(72) Inventors: Markus Mehlan, Munich (DE); Christian Scheurer, Leinfelden-Echterdingen (DE); Georg Tischler, Leipzig (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 7 days.

(21) Appl. No.: 15/111,832

(22) PCT Filed: Jan. 15, 2014

(86) PCT No.: PCT/EP2014/050688
§ 371 (c)(1),
(2) Date: Jul. 15, 2016

(87) PCT Pub. No.: WO2015/106807
PCT Pub. Date: Jul. 23, 2015

(65) Prior Publication Data
US 2016/0338490 A1  Nov. 24, 2016

(51) Int. Cl.
*A47B 83/00* (2006.01)
*A47C 16/02* (2006.01)
(Continued)

(52) U.S. Cl.
CPC .......... *A47B 83/001* (2013.01); *A47C 16/025* (2013.01); *B60N 3/063* (2013.01); *B61C 17/04* (2013.01); *A47B 2200/0097* (2013.01)

(58) Field of Classification Search
CPC .... A47C 16/025; A61G 7/0755; B61C 17/04; B60N 3/063; A47B 2200/0098; A47B 2200/0097; A47B 83/001
(Continued)

(56) References Cited

U.S. PATENT DOCUMENTS 640,891 A * 1/1900 Eisenhuth .............. B60N 3/063
296/75
2,528,331 A * 10/1950 Bell ...................... A47C 16/025
108/8
(Continued)

FOREIGN PATENT DOCUMENTS

DE   1810771 A1 *  5/1970 ........... A47C 16/025
DE   2941894 A1    4/1981
(Continued)

OTHER PUBLICATIONS

Fußpodeste [Foot Pedestals], http://www.chv-verkehrstechnik.de/de/leistungsangebot/fusspodeste.html; 2012; English translation.

*Primary Examiner* — Milton Nelson, Jr.
(74) *Attorney, Agent, or Firm* — Laurence Greenberg; Werner Stemer; Ralph Locher

(57) ABSTRACT

A foot support platform has a foot rest plate mounted pivotably on a housing of the foot platform. The lower face of the foot rest plate is supported by a spring. A mechanical detent device locks the foot rest plate in a pivot position. The foot platform is further provided with a remote-controlled mechanical locking device for engagement with the mechanical detent device. There is also described a desk having a foot platform.

7 Claims, 4 Drawing Sheets

(51) Int. Cl.
*B61C 17/04* (2006.01)
*B60N 3/06* (2006.01)

(58) Field of Classification Search
USPC ........................................ 297/423.46, 423.44
See application file for complete search history.

(56) References Cited

U.S. PATENT DOCUMENTS

| | | | | |
|---|---|---|---|---|
| 2,566,498 | A | * | 9/1951 | Revercomb .......... A47C 16/025 297/423.46 |
| 3,784,135 | A | * | 1/1974 | Owen, Jr. ................ F16B 7/105 108/6 |
| 4,277,660 | A | | 7/1981 | Lemmer |
| 5,374,102 | A | * | 12/1994 | Archambault ......... B60N 2/062 297/301.6 |
| 2012/0112035 | A1 | | 5/2012 | Volke et al. |
| 2013/0220168 | A1 | | 8/2013 | Volke et al. |

FOREIGN PATENT DOCUMENTS

| | | | | |
|---|---|---|---|---|
| DE | 19615532 C1 | 6/1997 | | |
| DE | 20000612 U1 | 3/2000 | | |
| DE | 102012216561 B3 | 12/2013 | | |
| EP | 0008753 A1 | 3/1980 | | |
| JP | 09263168 A | * 10/1997 | ............. | B60N 3/063 |
| WO | WO 2011151566 A1 | * 12/2011 | ............. | B60N 3/063 |

* cited by examiner

FOOT PLATFORM AND DESK COMPRISING A FOOT PLATFORM

BACKGROUND OF THE INVENTION

Field of the Invention

It is important for workstations where work requires an operator to sit on a seat for quite long periods of time without a break to be configured such that they are set up in an optimum manner ergonomically for the operator in question. This means they should be equipped to allow the height of the seat to be adjusted so that the operator in question can arrange him/herself in an optimum position for performing a task or operating equipment or a vehicle. A particular aspect of stations for driving vehicles is that as well as ergonomic requirements a clear view imposes its own requirements. The relationship between the eyes of the vehicle driver and windows that allow a clear view is not arbitrary. The seat height and height of the operating console cannot therefore be changed randomly.

A foot platform is also frequently required to equip the workstation in a particularly good ergonomic manner. In particular when workstations are used by different people, a simple embodiment is inadequate as people have legs of different lengths. Foot platforms are therefore frequently equipped so that they can be adjusted individually by the operator in question.

It is therefore known to equip a foot platform for the driving position in a rail vehicle with a pivotable foot rest plate which can be adjusted manually to a pivot position suitable for the operator in question. This has the disadvantage that the operator in question must ascertain his/her optimum foot rest plate pivot position in order to adjust the foot platform accordingly when starting work in the driving position or must experiment until an optimum pivot position of the foot rest plate is reached.

BRIEF SUMMARY OF THE INVENTION

It is the object of the invention to propose a foot platform with a foot rest plate mounted pivotably on a housing of the foot platform, with which the foot rest plate can be adjusted with optimum convenience using simple means.

Said object is achieved according to the invention with a foot platform with a foot rest plate mounted pivotably on a housing of the foot platform, the lower face of said foot rest plate being supported by a spring, and with mechanical detent means for locking the foot rest plate in a pivot position; the foot platform is also provided with a remote-controlled mechanical locking facility for engaging in the mechanical detent means.

Known from the internet publication is a mechanical foot platform, the foot rest plate of which is driven by a gas spring and which has a remote control facility but this known foot platform is a platform with a foot rest plate that can be adjusted in the manner of a slide using a helical gear unit.

One important advantage of the inventive foot platform is that it can be actuated in a convenient manner using simple means, as actuation of the remote controlled locking facility allows the spring to act on the foot rest plate, causing the foot rest plate to pivot upward until it is held by the feet of the operator in question in the desired optimum pivot position. Release of the locking facility causes the foot rest plate then to be set in said pivot position. This procedure is so undemanding that it can be performed by an operator without significant distraction even during the course of the actual activity. Also the inventive foot platform requires no auxiliary energy.

The spring can be configured in a number of different ways in the inventive foot platform. It is deemed particularly advantageous for the spring to be a gas spring.

Also the detent means for locking the foot rest plate can be embodied in different ways in the inventive foot platform. It is deemed particularly advantageous for the detent means to have at least one perforated plate which is fastened to the housing in the pivot direction of the foot rest plate. The locking facility also has a spring-loaded latching element in such an arrangement on the foot rest plate that it can be inserted into the holes in the perforated plate from the side. This latching element can be embodied in the manner of a snap lock or a spring-loaded plunger.

It is also deemed advantageous to position the perforated plate to the side of the foot rest plate on the housing, as this can be achieved with relatively little structural outlay.

It can also be advantageous for the detent means to have a friction lining which is fastened to the housing in the pivot direction of the foot rest plate and for the locking facility to be a spring-loaded friction element in such an arrangement that it can be moved against the friction lining from the side.

The locking facility of the inventive foot platform advantageously has a Bowden cable, as Bowden cables are widely available and are therefore economical to use.

The invention further relates to a desk of a workstation with a foot platform and aims to configure the foot platform of such a desk in such a manner that the foot platform can be adjusted conveniently to the respectively desired position in respect of the foot rest plate when an operator is seated.

To achieve this object, according to the invention the foot platform is positioned below the desk and the locking facility is fastened in an easily accessible manner to the desk at its end facing away from the foot rest plate.

Said desk is advantageous in that a seated operator can adjust the foot platform into an optimum pivot position in each instance in a simple manner by actuating the locking facility subject to the action of the spring, it being possible for this to be done without stopping work and without significant distraction from work.

The inventive desk can be used at different workstations as well as at operating stations of different types of vehicles. It is deemed particularly advantageous for the desk to be the operating console of a driving position in a rail vehicle and for the foot platform to be fastened to the base of the driving position and for the locking facility to be fastened with its end facing away from the foot platform laterally forward in the upper region of a recess of the operating console accommodating the foot platform.

BRIEF DESCRIPTION OF THE SEVERAL VIEWS OF THE DRAWING

To clarify the invention further

DESCRIPTION OF THE INVENTION

Figure 1:
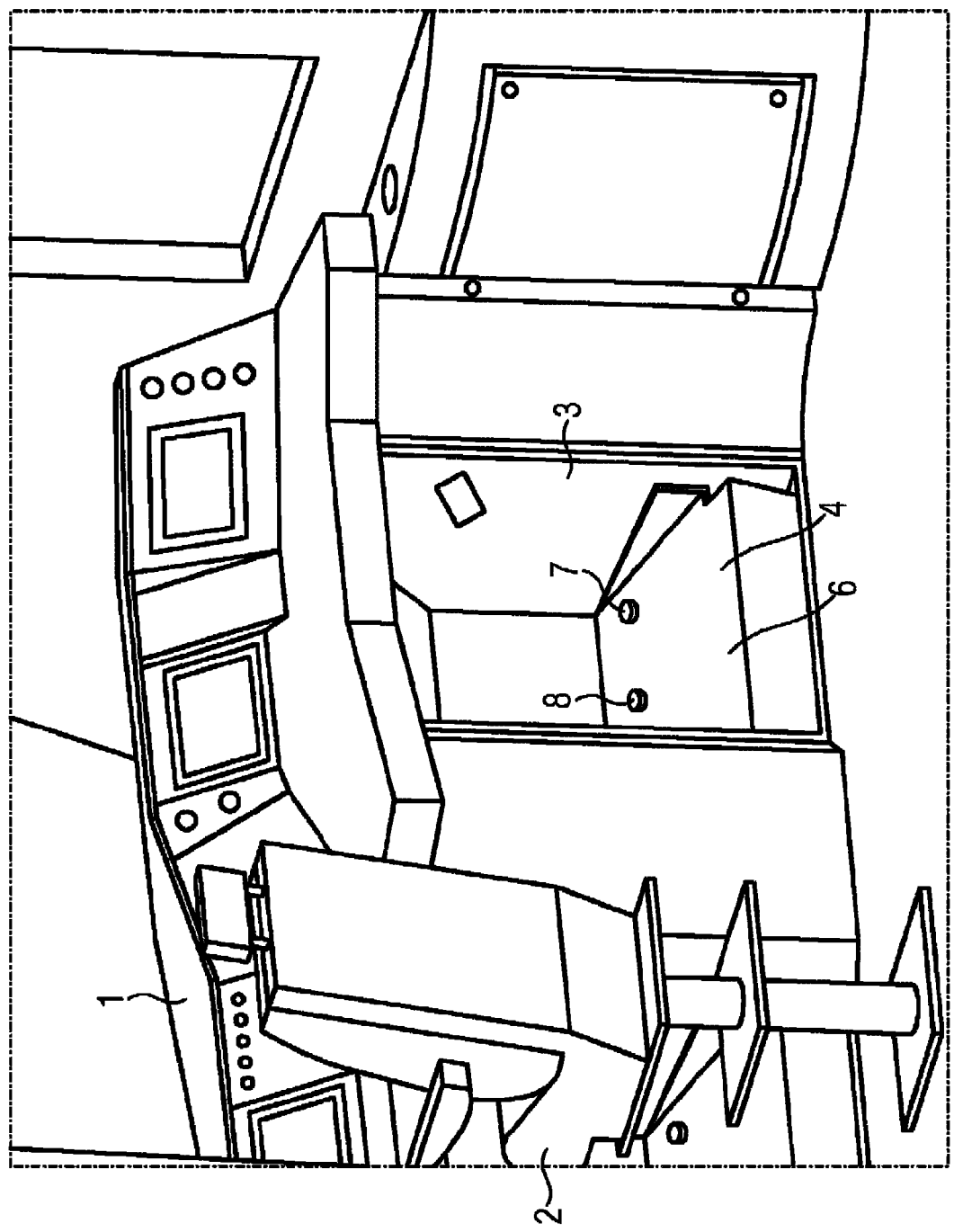
FIG. 1 shows an oblique view of an exemplary embodiment of a desk in the form of an operating console in the driving position of a rail vehicle with an exemplary embodiment of the inventive foot platform.

The exemplary embodiment of an inventive desk shown in FIG. 1 is an operating console 1 of a rail vehicle, the rest of which is not shown. As shown in detail in FIG. 1, the operating console is equipped with two workstations, each having a seat 2. The seat at the workstation on the right in FIG. 1 has been removed for greater clarity. Each workstation is provided with a recess 3 below the console 1. A foot platform 4 is accommodated or fastened in the recess 3.

Figure 4:
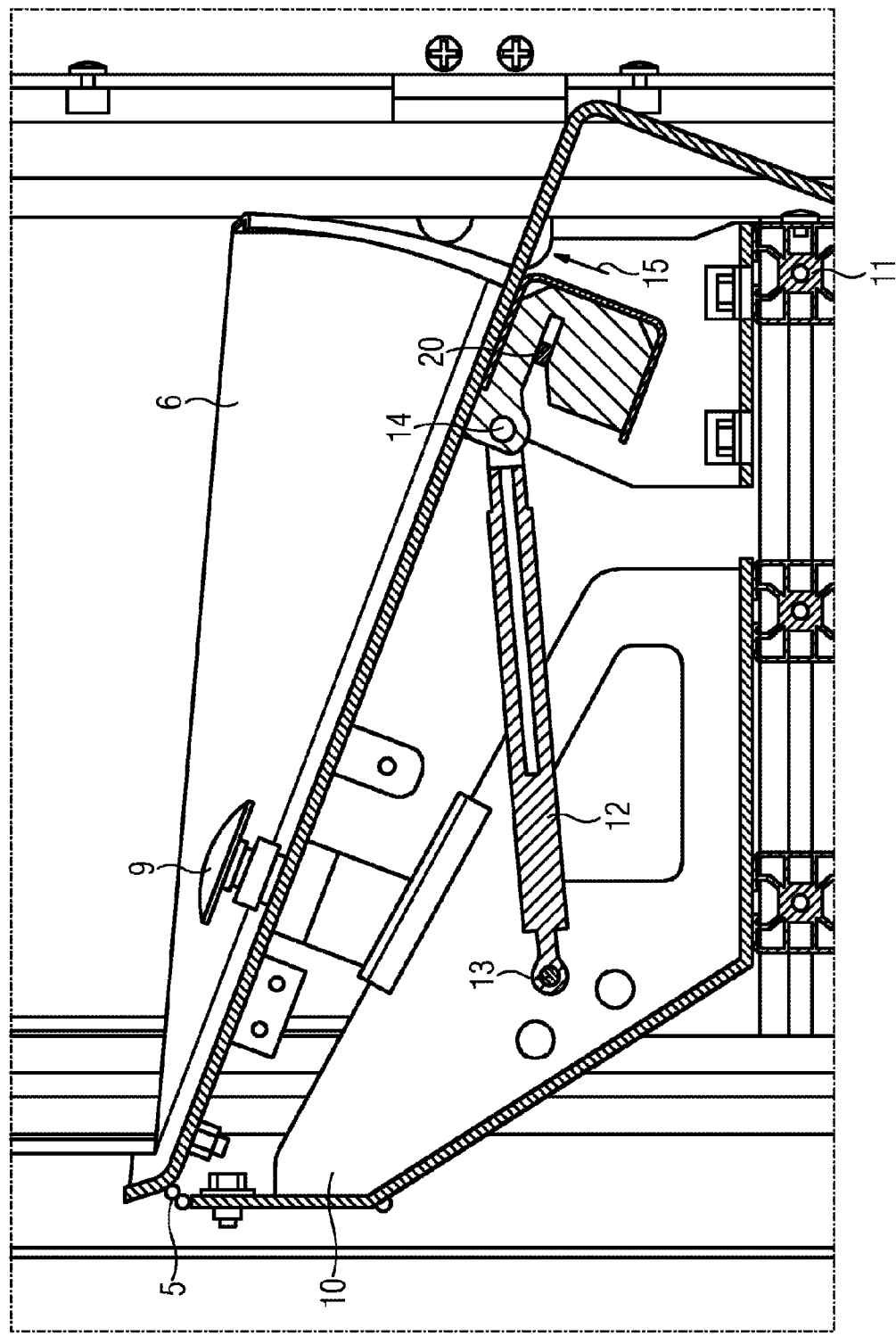

The foot platform 4 has a foot rest plate 6 arranged pivotably by means of a hinge 5 (see FIG. 4). The foot rest plate 6 is equipped with a number of actuating switches 7, 8 and 9 (see FIG. 2) in the form of foot switches.

As shown in particular in FIG. 4, the foot platform 4 has a housing 10, the lower region of which is fastened to a rail 11 of the rail vehicle. As also shown in FIG. 4, a gas spring 12 is fastened pivotably to the housing 10 by its one end 13 below the foot rest plate 4. Another end 14 of the gas spring 12 engages with the bottom of the foot rest plate 4, thereby applying a torque to the foot rest plate 4 in the direction of the arrow 15.

To control the action of the gas spring 12, a perforated plate 17 with a number of holes 18 is fastened to the housing 10 in the direction of the pivot movement of the foot rest plate 4 to the side of the foot rest plate 4, therefore next to the foot rest plate 4. A spring-loaded latching element 19 (only shown schematically in FIG. 4) of a locking facility can engage in said holes 18 to lock the foot rest plate 4 in an established optimum position.

Figure 2:
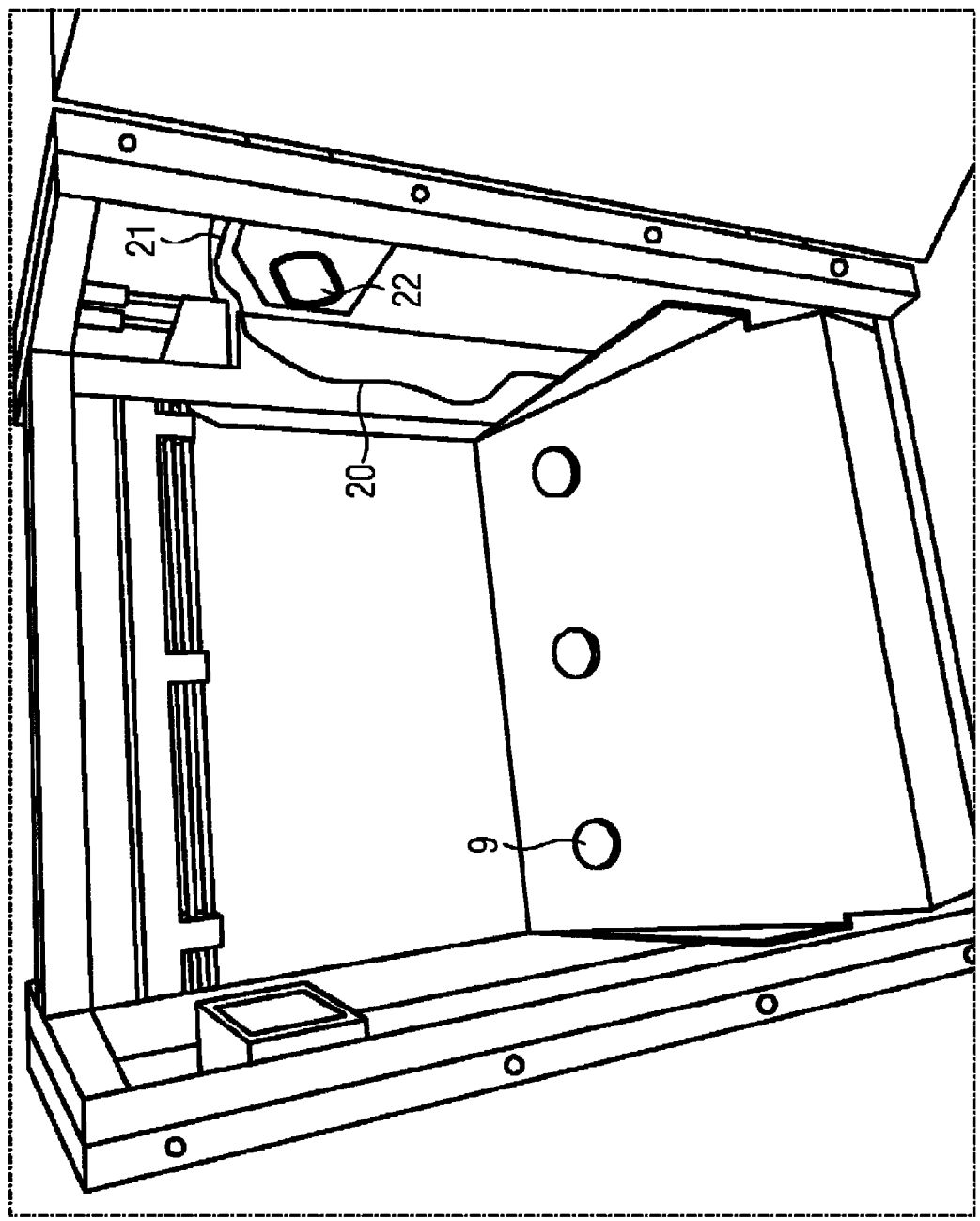
FIG. 2 shows a further view of the desk according to FIG. 1 with the wall paneling removed in a recess of the desk.
Figure 3:
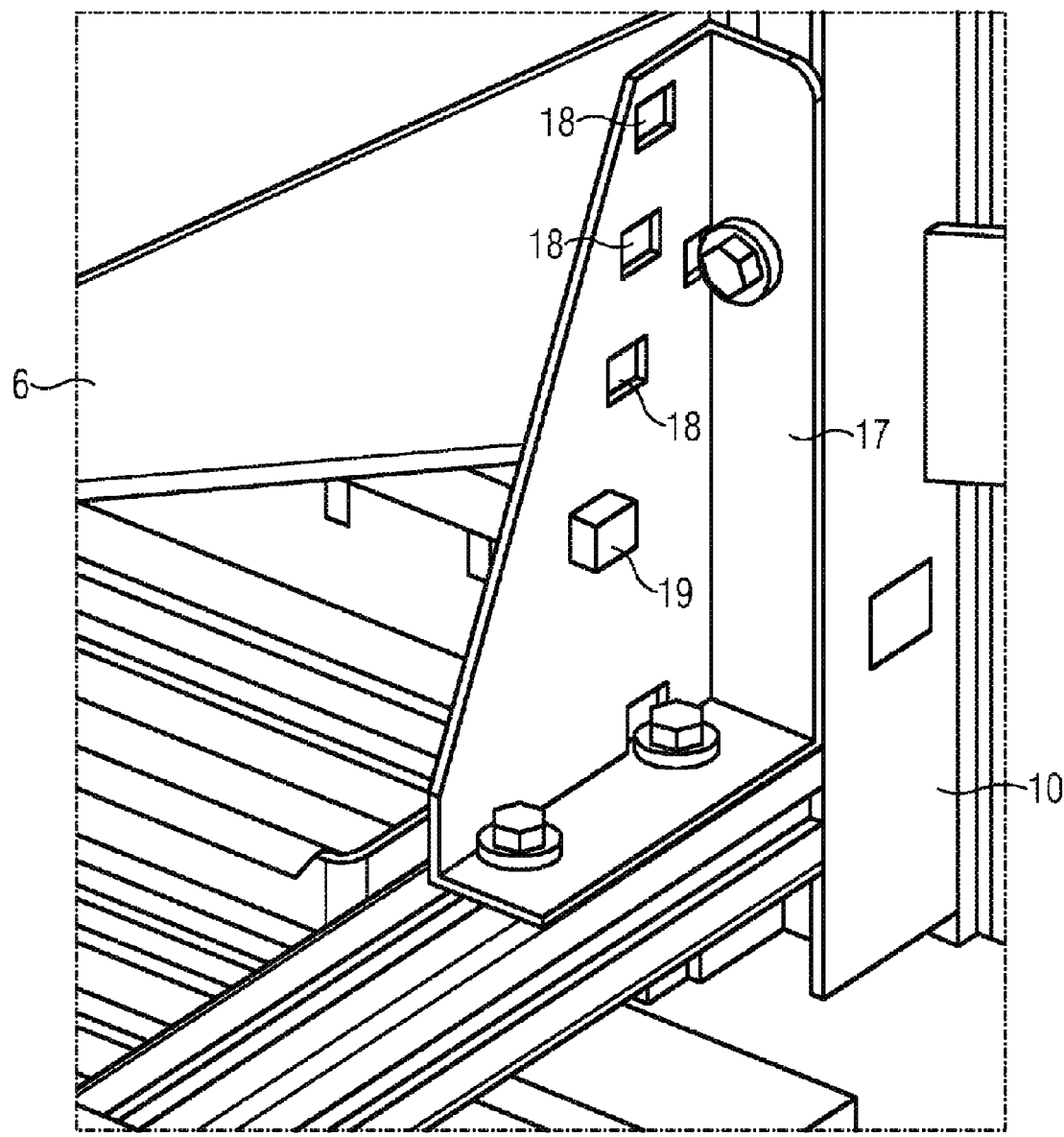
FIG. 3 shows an oblique view of a perforated plate of the detent means and FIG. 4 shows a side view of the same exemplary embodiment of the foot platform.

The latching element 19 can be part of a locking facility embodied in the form of a Bowden cable 20, as shown in FIG. 2. The Bowden cable 20 here is connected at its end 21 away from the foot rest plate 4 to an actuation facility 22, which is embodied here as a switch lever.

The invention claimed is:

1. A foot platform, comprising:
a housing;
a foot rest plate pivotally mounted to said housing, said foot rest plate having a lower face;
a spring supporting said lower face of said foot rest plate;
a mechanical detent device for locking said foot rest plate in a given pivot position; and
a remote-controlled mechanical locking facility on said foot rest plate for engaging in said mechanical detent device;
said detent device including a perforated plate fastened to said housing in a pivot direction of said foot rest plate, and said locking facility having a spring-loaded latching element disposed on said foot rest plate enabling an insertion thereof laterally from a side into holes in said perforated plate.

2. The foot platform according to claim 1, wherein said spring is a gas spring.

3. The foot platform according to claim 1, wherein said perforated plate is positioned laterally of said foot rest plate on said housing.

4. A foot platform, comprising:
a housing;
a foot rest plate pivotally mounted to said housing, said foot rest plate having a lower face;
a spring supporting said lower face of said foot rest plate;
a mechanical detent device for locking said foot rest plate in a given pivot position; and
a remote-controlled mechanical locking facility on said foot rest plate for engaging in said mechanical detent device;
wherein said detent device has a friction lining fastened to said housing in a pivot direction of said foot rest plate and said locking facility is a spring-loaded friction element disposed for movement against said friction lining from a side.

5. A foot platform, comprising:
a housing;
a foot rest plate pivotally mounted to said housing, said foot rest plate having a lower face;
a spring supporting said lower face of said foot rest plate;
a mechanical detent device for locking said foot rest plate in a given pivot position; and
a remote-controlled mechanical locking facility on said foot rest plate for engaging in said mechanical detent device, said locking facility including a Bowden cable.

6. A workstation, comprising:
a desk;
a foot platform according to claim 1 positioned below said desk; and
wherein said locking facility of said foot platform is fastened in an easily accessible location to said desk at an end thereof facing away from said foot rest plate.

7. The workstation according to claim 6, wherein said desk is an operator console of a driver control station in a rail vehicle and said foot platform is fastened to a base of said driver control station and said locking facility is fastened with an end facing away from said foot platform laterally forward in an upper region of a recess of said operating console accommodating said foot platform.

* * * * *